(12) United States Patent
Subramaniyam

(10) Patent No.: US 8,679,324 B2
(45) Date of Patent: Mar. 25, 2014

(54) ADDITIVE AND METHOD FOR REMOVAL OF IMPURITIES FORMED DUE TO SULFUR COMPOUNDS IN CRUDE OILS CONTAINING CALCIUM NAPHTHENATE

(75) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 0 days.

(21) Appl. No.: 13/519,831

(22) PCT Filed: Dec. 28, 2010

(86) PCT No.: PCT/IN2010/000858
§ 371 (c)(1),
(2), (4) Date: Jun. 28, 2012

(87) PCT Pub. No.: WO2011/080759
PCT Pub. Date: Jul. 7, 2011

(65) Prior Publication Data
US 2012/0285865 A1 Nov. 15, 2012

(30) Foreign Application Priority Data
Dec. 31, 2009 (IN) .......................... 3050/MUM/2009

(51) Int. Cl.
*C10G 17/00* (2006.01)

(52) U.S. Cl.
USPC ........................................ 208/252; 562/577

(58) Field of Classification Search
USPC ....................................................... 208/252
See application file for complete search history.

(56) References Cited

U.S. PATENT DOCUMENTS

| 4,476,930 A | 10/1984 | Watanabe |
| 5,284,635 A * | 2/1994 | Frederic .................. 423/226 |
| 5,723,662 A * | 3/1998 | Ebmeyer et al. .............. 562/579 |
| 6,068,056 A | 5/2000 | Frenier et al. |
| 7,497,943 B2 | 3/2009 | Nguyen et al. |
| 2009/0152164 A1* | 6/2009 | Nguyen et al. .................. 208/14 |

FOREIGN PATENT DOCUMENTS

| WO | 2008062433 A2 | 5/2008 |
| WO | 2009113095 A2 | 9/2009 |
| WO | 2011080759 A1 | 7/2011 |

OTHER PUBLICATIONS

Foreign communication from related counterpart application—International Search Report and Written Opinion, PCT/IN2010/000858, Jun. 8, 2011, 9 pages.

* cited by examiner

*Primary Examiner* — Prem C Singh
*Assistant Examiner* — Juan Valencia
(74) *Attorney, Agent, or Firm* — Conley Rose, P.C.; Rodney B. Carroll

(57) ABSTRACT

An additive capable of avoiding formation of impurities and capable of removing or dissolving impurities formed and accumulated at the interphase of organic and aqueous layers on reaction between calcium naphthenate and sulfur compound including $H_2S$ in presence of water in mixture of crude oils containing calcium naphthenate and sulfur compound or $H_2S$, wherein the additive is glyoxylic acid is provided. A method for avoiding formation of impurities and for removing or dissolving impurities formed and accumulated at the interphase of organic and aqueous layers on reaction between calcium naphthenate and sulfur compound including $H_2S$ in presence of water in mixture of crude oils containing calcium naphthenate and sulfur compound including $H_2S$, comprising treating mixture of crude oils containing calcium naphthenate and sulfur compound or $H_2S$ with glyoxylic acid is also provided.

16 Claims, 9 Drawing Sheets

ADDITIVE AND METHOD FOR REMOVAL OF IMPURITIES FORMED DUE TO SULFUR COMPOUNDS IN CRUDE OILS CONTAINING CALCIUM NAPHTHENATE

CROSS-REFERENCE TO RELATED APPLICATIONS

This application is a filing under 35 U.S.C. 371 of International Application No. PCT/IN2010/000858 filed Dec. 28, 2010, entitled "Additive And Method For Removal Of Impurities Formed Due To Sulfur Compounds In Crude Oils Containing Calcium Naphthenate," which claims priority to Indian Patent Application No. 3050/MUM/2009 filed on Dec. 31, 2009, which applications are incorporated by reference herein in their entirety.

FIELD OF THE INVENTION

The present invention relates to an additive and method for removal of impurities formed due to reaction between sulfur compounds, such as hydrogen sulfide [$H_2S$] and calcium naphthenate in a mixture of crude oils containing calcium naphthenate and sulfur compounds.

Particularly, the present invention relates to an additive and method for removal of impurities formed due to reaction between sulfur compounds, such as hydrogen sulfide [$H_2S$] and calcium naphthenate in presence of water in a mixture of crude oils containing calcium naphthenate and sulfur compounds.

BACKGROUND OF THE INVENTION

The DOBA is a high acid crude oil originating from the Chad region of West Africa. The DOBA is known to contain calcium naphthenate and the amount of calcium naphthenate varies over a range from about 150 to about 700 ppm. In a typically supplied DOBA crude oil, the amount of calcium naphthenate may vary from about 250-about 300 ppm.

The DOBA is a heavy high acid crude oil with Total Acid Number [TAN] ranging upwards of 4.0 mg KOH/gm of sample and the American Petroleum Institute (API) gravity is about 19. However, the sulfur content in DOBA is very low to nil.

The DOBA is typically a crude oil with a lot of residue in it and for proper blending, typically internationally, refiners blend it with very light crude oil or condensates to increase the API of the resulted blend to more than 30. Such blending with light crude oil or condensates helps to create sufficient light ends to help achieve product yields for the crude distillation unit. The most of light crude oil or condensates thus selected generally have very little to nil sulfur contents or existent and potential $H_2S$, which means the overall sulfur content still remains very low. Further, the $H_2S$ being oil soluble is not present in relatively higher quantities in these types of blends.

The inventor has observed when DOBA or its above described blends containing calcium naphthenate, but having sulfur contents or $H_2S$ being less than 0.2% is treated with additives as known in the art, for example with glycolic acid [US patent publication No. 2009/0152164 and U.S. Pat. No. 7,497,943—(US'943)], the presence of low amounts of sulfur in DOBA crude oil or its blends does not produce impurity, and hence, does not hamper removal of metals including calcium from such DOBA crude oil or its blends.

However, if the refiner processes the DOBA or its blends having API varying between about 24 to about 29 and a crude oil having sulfur or $H_2S$ contents in higher amounts as compared to above situation, the presence of higher amounts of sulfur or $H_2S$ contents in presence of water will have first chance to react with calcium naphthenate and as a result several reactions occur, which have been found to produce insoluble and soluble impurities, wherein the insoluble impurities get accumulated in the form of a black layer at the interphase of organic and aqueous layers during isolation of metals including calcium from the DOBA or its blends. The formation of impurities due to reactions between calcium naphthenate and sulfur compounds or $H_2S$ in presence of water and their accumulation at the interphase of organic and aqueous layers has been found not only to hamper processing of crude oils, but also the removal of metals including calcium.

The inventor of present invention has observed that if solution of calcium naphthenate in an organic solvent, for example toluene having concentration of Ca of about 2247 ppm is treated with equal weight of water by heating to about 130 degree C., that is, in absence of sulfur compound or $H_2S$ in a Parr autoclave under autogenous pressure, and separated into organic and aqueous layers in a separating funnel, no black layer is formed at the interphase which indicates that calcium naphthenate does not hydrolyze in absence of sulfur compound or $H_2S$, which also indicates that no impurities are formed which could have accumulated at the interphase. When organic layer, as separated, was dried by evaporating toluene, its acid value was found to be very low of about 48.36 (mg KOH per gm) which also indicates that calcium naphthenate did not hydrolyze meaning thereby the calcium is not removed from the oil. When IR of dried organic material was taken, as shown in accompanying FIG. 1, presence of peaks at about 1555.3 $cm^{-1}$ and at about 1678.7 $cm^{-1}$ also indicates that calcium naphthenate did not hydrolyze in absence of sulfur or $H_2S$ meaning thereby the calcium is not removed from the oil. In the description herein, this experiment may be referred as experiment 1.

When solution of calcium naphthenate in toluene having concentration of Ca of about 2247 ppm and saturated with $H_2S$ [or sulfur compound] by purging $H_2S$ in a manner to have concentration of $H_2S$ in the vapour phase of about 13 vol % was treated with equal weight of water by heating to about 130 degree C., that is, in presence of sulfur compound or $H_2S$, in Parr autoclave under autogenous pressure, calcium naphthenate was found to react with $H_2S$ [or sulfur compound] in presence of water and on separation of organic and aqueous layers after cooling to room temperature in a separating funnel, a black layer was formed at the interphase which indicated that calcium naphthenate gets hydrolyzed in presence of $H_2S$ [or sulfur compound] and water, and impurities formed thereby get accumulated at the interphase. When organic layer, as separated, was dried by evaporating toluene, its acid value was found to be high of about 156.26 (mg KOH per gm) which also indicated that calcium naphthenate got hydrolyzed meaning thereby calcium is removed from the calcium naphthenate in oil or hydrocarbon. When IR of dried organic material was taken, as shown in accompanying FIG. 2, presence of weak peak at 1535.7 $cm^{-1}$ and no peak at 1680.7 $cm^{-1}$, but strong peak at 1696.2 $cm^{-1}$ in the IR spectrum also indicated that calcium naphthenate is hydrolyzed in presence of $H_2S$ [or sulfur compound] and water meaning thereby calcium is removed from the calcium naphthenate in oil or hydrocarbon. In the description herein, this experiment may be referred as experiment 2.

When experiment 2 was repeated in a manner to have concentration of $H_2S$ in the vapour phase of about 5 vol % to see if the lower concentration of $H_2S$ also results in formation of impurities and their accumulation at the interphase, it was found that even at lower concentration of 5 vol % of $H_2S$ impurities are formed and get accumulated at the interphase even for the period up to 60 min. In the description herein, this experiment may be referred as experiment 2A. The calcium concentration in the organic layer, as measured by Inductive coupled plasma (ICP) and acid value (AV) of the compound obtained after drying the organic layer are provided against time in the Table-I, which indicate that only up to 39.9% of Ca is removed without any additive:

TABLE I

| Sr. No. | Time | Acid Value (MgKOH/gm) | % Efficiency (by AV) | Ca Conc. (ppm) | % Efficiency (by Ca) |
|---|---|---|---|---|---|
| 1 | 5 min | 60.05 | 26.1 | 1617 | 28 |
| 2 | 15 min | 66.97 | 29.6 | 1545 | 31.2 |
| 3 | 30 min | 77.62 | 33.7 | 1465 | 34.8 |
| 4 | 60 min | 88.33 | 38.4 | 1350 | 39.9 |

Accordingly, the industry processing DOBA or its blend containing calcium naphthenate and a crude oil containing sulfur compounds or $H_2S$ faces problems of formation of impurities upon reaction of calcium naphthenate and sulfur compounds or $H_2S$ in presence of water for example when such crude oils are processed through desalter and such impurities continue to get accumulated in the system which not only hampers processing of crude oils, but also adversely effect removal of metals including calcium.

PROBLEM TO BE SOLVED BY THE INVENTION

Therefore, problem to be solved is to provide an additive and method for removal of impurities formed due to reaction between sulfur compounds, such as hydrogen sulfide [$H_2S$] and calcium naphthenate in presence of water in a mixture of crude oils containing calcium naphthenate and sulfur compounds, such as hydrogen sulfide [$H_2S$].

With above aim, the inventor has tried to solve above industrial problem with additives known in the prior art, and found that when solution of calcium naphthenate in toluene and purged with $H_2S$ as prepared in experiment 2 was treated in same manner as in experiment 2, but with equal weight of water containing prior art additive—citric acid (C3 alpha-hydroxy-tricarboxylic acid), impurities were still formed and got accumulated as black layer at the interphase indicating that calcium naphthenate does hydrolyze in presence of $H_2S$ [or sulfur compound] and water, but citric acid additive was ineffective in avoiding formation of impurities, and thereby, in accumulation of black layer at the interphase. The acid value of about 229.36 (mg KOH per gm) of separated and dried organic layer, and no peak at 1538 $cm^{-1}$ and at 1680.7 $cm^{-1}$, but strong peak at 1698.7 $cm^{-1}$ in its IR spectra, as shown in accompanying FIG. 3, were also indicative of hydrolysis of calcium naphthenate. In the description herein, this experiment may be referred to as experiment 3.

When experiment 3 was repeated with concentration of $H_2S$ in the vapour phase of about 5 vol % to see if citric acid additive is effective to avoid formation of impurities and their accumulation at the interphase, it was found that even at lower concentration of 5 vol % of $H_2S$, the citric acid additive was ineffective in avoiding formation of impurities and their accumulation at the interphase even when organic layer has been treated for a period up to 60 min. In the description herein, this experiment may be referred as experiment 3A. The calcium concentration in the organic layer, as measured by ICP and AV of the compound obtained after drying the organic layer are provided against time in the Table-II, which indicate that citric acid may be effective in removing the calcium, but it has not been found to be effective in avoiding formation of impurities and their accumulation at the interphase even when hydrocarbon layer is treated for a period up to 60 min:

TABLE II

| Sr. No. | Time | Acid Value (MgKOH/gm) | % Efficiency (by AV) | Ca Conc. (ppm) | % Efficiency (by Ca) |
|---|---|---|---|---|---|
| 1 | 5 min | 203.14 | 88.3 | 42 | 98.13 |
| 2 | 15 min | 208.38 | 90.6 | 38 | 98.31 |
| 3 | 30 min | 222.43 | 96.7 | 36 | 98.40 |
| 4 | 60 min | 221.79 | 96.4 | 30 | 98.6 |

When solution of calcium naphthenate in toluene and purged with $H_2S$ as prepared in experiment 2 was treated in same manner as in experiment 2, but with equal weight of water containing prior art additive—maleic anhydride, the impurities were still formed and got accumulated as dense black layer at the interphase indicating that calcium naphthenate does hydrolyze in presence of $H_2S$ [or sulfur compound] and water, but maleic anhydride additive was also ineffective in avoiding formation of impurities, and thereby, in accumulation of black layer at the interphase. The acid value of about 216.18 (mg KOH per gm) of separated and dried organic layer, and no peak at 1538 $cm^{-1}$ and at 1680.7 $cm^{-1}$, but strong peak at 1698.9 $cm^{-1}$ in its IR spectra, as shown in accompanying FIG. 4, were also indicative of hydrolysis of calcium naphthenate. In the description herein, this experiment may be referred to as experiment 4.

When experiment 4 was repeated with concentration of $H_2S$ in the vapour phase of about vol % to see if maleic anhydride additive is effective to avoid formation of impurities and their accumulation at the interphase, it was found that even at lower concentration of 5 vol % of $H_2S$, the maleic anhydride additive was ineffective in avoiding formation of impurities and their accumulation at the interphase even when organic layer has been treated for a period up to 60 min. In the description herein, this experiment may be referred to as experiment 4A. The calcium concentration in the organic layer, as measured by ICP, and AV of the compound obtained after drying the organic layer are provided against time in the Table-III, which indicate that maleic anhydride additive may be effective in removing the calcium, but it has not been found to be effective in avoiding formation of impurities and their accumulation at the interphase even when hydrocarbon layer is treated for a period up to 60 min:

TABLE III

| Sr. No. | Time | Acid Value (MgKOH/gm) | % Efficiency (by AV) | Ca Conc. (ppm) | % Efficiency (by Ca) |
|---|---|---|---|---|---|
| 1 | 5 min | 212.25 | 92.3 | 77 | 96.57 |
| 2 | 15 min | 205.66 | 89.4 | 93 | 95.86 |
| 3 | 30 min | 207.34 | 90.1 | 77 | 96.88 |
| 4 | 60 min | 214.88 | 93.4 | 214 | 90.48 |

When solution of calcium naphthenate in toluene and purged with $H_2S$ as prepared in experiment 2 was treated in same manner as in experiment 2, but with equal weight of water containing prior art additive—glycolic acid in stoichometric equivalent to calcium concentration, the impurities were still formed and got accumulated as black layer at the interphase of organic and aqueous layers indicating that calcium naphthenate does hydrolyze in presence of $H_2S$ [or sulfur compound] and water, but glycolic acid additive was also ineffective in avoiding formation of impurities, and thereby, in accumulation of black layer at the interphase. The acid value of about 214.6 (mg KOH per gm) of separated and dried organic layer, and no peak at 1538 cm$^{-1}$ and at 1680.7 cm$^{-1}$, but strong peak at 1698.8 cm$^{-1}$ in its IR spectra, as shown in accompanying FIG. 5, were also indicative of hydrolysis of calcium naphthenate. In the description herein, this experiment may be referred to as experiment 5.

When experiment 5 was repeated with concentration of H$_2$S in the vapour phase of about 5 vol % to see if glycolic acid additive is effective to avoid formation of impurities and their accumulation at the interphase, it was found that even at lower concentration of 5 vol % of H$_2$S, the glycolic acid additive was ineffective in avoiding formation of impurities and their accumulation at the interphase even when organic layer has been treated for a period up to 60 min. In the description herein, this experiment may be referred as experiment 5A. The calcium concentration in the organic layer, as measured by ICP, and AV of the compound obtained after drying the organic layer are provided against time in the Table-IV, which indicate that glycolic acid additive may be effective in removing the calcium, but it has not been found to be effective in avoiding formation of impurities and their accumulation at the interphase even when hydrocarbon layer is treated for a period up to 60 min:

TABLE IV

| Sr. No. | Time | Acid Value (MgKOH/gm) | % Efficiency (by AV) | Ca Conc. (ppm) | % Efficiency (by Ca) |
|---|---|---|---|---|---|
| 1 | 5 min | 191.31 | 83.2 | 245 | 89.1 |
| 2 | 15 min | 193.29 | 84.0 | 183 | 91.9 |
| 3 | 30 min | 199.0 | 86.5 | 130 | 94.2 |
| 4 | 60 min | 199.5 | 86.7 | 180 | 92.0 |

When solution of calcium naphthenate in toluene and purged with H$_2$S as prepared in experiment 2 was treated in same manner as in experiment 2 with equal weight of water, the impurities were formed and got accumulated as dense black layer at the interphase indicating that calcium naphthenate does hydrolyze in presence of H$_2$S [or sulfur compound] and water. The aqueous layer was carefully drained and prior art additive—glycolic acid in stoichiometric equivalent to calcium was dissolved in this separated aqueous layer, which is then transferred back to the separating funnel containing organic and black layers, and the contents were vigorously shaken. It was observed that black layer formed did not get disappeared or dissolved, which confirms that additive glycolic acid was not effective in dissolving the impurities which had got accumulated as black layer at the interphase. The acid value of about 231.53 (mg KOH per gm) of separated and dried organic layer, and no peak at 1538 cm$^{-1}$ and at 1680.7 cm$^{-1}$, but strong peak at 1699.0 cm$^{-1}$ in its IR spectra, as shown in accompanying FIG. 6, were also indicative of hydrolysis of calcium naphthenate. In the description herein, this experiment may be referred to as experiment 6. It may be noted that this experiment was also performed by direct addition of aqueous solution of additive glycolic acid after accumulation of black layer at the interphase, and found that black layer did not dissolve or disappear indicating that glycolic acid was not effective in removing or dissolving black layer formed by accumulation of impurities at the interphase.

When solution of calcium naphthenate in toluene and purged with H$_2$S as prepared in experiment 2 was treated in same manner as in experiment 2, but with equal weight of water containing additive—DL-malic acid in stoichometric equivalent to calcium concentration, the impurities were still formed and got accumulated as black layer at the interphase of organic and aqueous layers indicating that calcium naphthenate does hydrolyze in presence of H$_2$S [or sulfur compound] and water, but DL-malic acid additive was also ineffective in avoiding formation of impurities, and thereby, in accumulation of black layer at the interphase. The acid value of about 213.5 (mg KOH per gm) of separated and dried organic layer, and no peak at 1538 cm$^{-1}$ and at 1680.7 cm$^{-1}$, but strong peak at 1699.8 cm$^{-1}$ in its IR spectra, as shown in accompanying FIG. 7, were also indicative of hydrolysis of calcium naphthenate. In the description herein, this experiment may be referred to as experiment 7.

When experiment 7 was repeated with concentration of H$_2$S in the vapour phase of about 5 vol % to see if DL-malic acid additive is effective to avoid formation of impurities and their accumulation at the interphase, it was found that even at lower concentration of 5 vol % of H$_2$S, the DL-malic acid additive was ineffective in avoiding formation of impurities and their accumulation at the interphase even when organic layer has been treated for a period up to 60 min. In the description herein, this experiment may be referred as experiment 7A. The calcium concentration in the organic layer, as measured by ICP, and AV of the compound obtained after drying the organic layer are provided against time in the Table-V, which indicate that DL-malic acid additive may be effective in removing the calcium, but it has not been found to be effective in avoiding formation of impurities and their accumulation at the interphase even when hydrocarbon layer is treated for a period up to 60 min:

TABLE V

| Sr. No. | Time | Acid Value (MgKOH/gm) | % Efficiency (by AV) | Ca Conc. (ppm) | % Efficiency (by Ca) |
|---|---|---|---|---|---|
| 1 | 5 min | 197.69 | 85.9 | 55 | 97.55 |
| 2 | 15 min | 211.78 | 92.0 | 48 | 97.8 |
| 3 | 30 min | 212.52 | 92.4 | 144 | 93.59 |
| 4 | 60 min | 211.45 | 91.9 | 94 | 95.82 |

The experiment no. 6 was also repeated with prior art additives for 5 vol % concentration of H$_2$S also, and was found that none of the prior art additives were capable of dissolving the already formed impurities or black layer at the interphase even for such a lower concentration of H$_2$S. In the description herein, these experiments may be referred as experiment 6A, 6B, 6C and 6D for prior art additive glycolic acid, DL-malic acid, maleic anhydride and citric acid respectively. The calcium concentration in the organic layer, as measured by ICP, and AV of the compound obtained after drying the organic layer are provided in the Table-VI, which indicate that the prior art additives may be effective in removing the calcium, but have not been found to be effective in dissolving the already formed impurities or black layer at the interphase:

TABLE VI

| Expt. No. | Prior art Additive | Acid Value (MgKOH/gm) | % Efficiency (by AV) | Ca Conc. (ppm) | % Efficiency (by Ca) | Observation |
| --- | --- | --- | --- | --- | --- | --- |
| 6A | Glycolic Acid | 192.39 | 83.7 | 337 | 85 | Impurities/Black layer does not disappear |
| 6B | DL-Malic Acid | 187.84 | 81.7 | 355 | 84.2 | Impurities/Black layer does not disappear |
| 6C | Maleic anhydride | 173.38 | 75.4 | 528 | 76.5 | Impurities/Black layer does not disappear |
| 6D | Citric acid | 218.0 | 94.7 | 112 | 95 | Impurities/Black layer does not disappear |

The inventor has also observed that even if the prior art additives are taken in double the stoichiometric equivalent of calcium concentration, none of these have been found to be effective in avoiding formation of impurities and their accumulation as black layer at the interphase. In the description herein, these experiments may be referred as experiment 8A, 8B, 8C and 8D for prior art additive glycolic acid, DL-malic acid, maleic anhydride and citric acid respectively. The calcium concentration in the organic layer, as measured by ICP, and AV of the compound obtained after drying the organic layer are provided in the Table-VII for treatment duration of 5 min, which indicate that the prior art additives may be effective in removing the calcium, but have not been found to be effective avoiding formation of impurities and their accumulation as black layer at the interphase:

TABLE VII

| Expt. No. | Prior art Additive | Acid Value (MgKOH/gm) | % Efficiency (by AV) | Ca Conc. (ppm) | % Efficiency (by Ca) | Observation |
| --- | --- | --- | --- | --- | --- | --- |
| 8A | Glycolic Acid | 205.45 | 89.3 | 112 | 95 | Impurities/Black layer does not disappear |
| 8B | DL-Malic Acid | 212.29 | 92.3 | 20 | 99.1 | Impurities/Black layer does not disappear |
| 8C | Maleic anhydride | 215.23 | 93.5 | 24 | 98.9 | Impurities/Black layer does not disappear |
| 8D | Citric acid | 225.24 | 97.9 | 12 | 99.46 | Impurities/Black layer does not disappear |

It is understood from the foregoing description that none of the prior art additives including citric acid (C3 alpha-hydroxy-tricarboxylic acid), maleic anhydride, glycolic acid and DL-Malic acid which may be effective to remove metal including calcium from DOBA crude oil, are neither effective to avoid formation of impurities on account of reaction between calcium naphthenate and sulfur compound or $H_2S$ in presence of water, nor effective to remove or dissolve the impurities which are formed on account of reaction between calcium naphthenate and sulfur compound or $H_2S$ in presence of water in mixture of crude oils containing calcium naphthenate and sulfur compound or $H_2S$.

NEED OF THE INVENTION

Therefore, there is a need to have an additive which is effective not only to avoid formation of impurities formed on account of reaction between calcium naphthenate and sulfur compound including $H_2S$ in presence of water, but also effective to remove or dissolve the impurities which are formed on account of reaction between calcium naphthenate and sulfur compound including $H_2S$ in presence of water in mixture of crude oils containing calcium naphthenate and sulfur compound including $H_2S$, and method thereof. Additionally, such additive should be capable of removing metal impurities including calcium from DOBA crude oil.

OBJECTS AND ADVANTAGES OF THE INVENTION

Accordingly, the main object of the present invention is to provide an additive which is effective not only to avoid formation of impurities which would have formed on account of reaction between calcium naphthenate and sulfur compound including $H_2S$ in presence of water, but is also effective to remove or dissolve the impurities which are formed on account of reaction between calcium naphthenate and sulfur compound including $H_2S$ in presence of water in mixture of crude oils containing calcium naphthenate and sulfur compound including $H_2S$. Additionally, the present invention aims to provide an additive which is effecting in removing metal including calcium from DOBA crude oil.

This is also an object of the present invention to provide a method to avoid formation of impurities which would have formed on reaction between calcium naphthenate and sulfur compound including $H_2S$ in presence of water in mixture of crude oils containing calcium naphthenate and sulfur compound including $H_2S$.

This is also an object of the present invention to provide a method to remove or dissolve the impurities formed on reaction between calcium naphthenate and sulfur compound including $H_2S$ in presence of water in mixture of crude oils containing calcium naphthenate and sulfur compound including $H_2S$.

This is also an object of the present invention to provide an additive which is effective to remove metals including calcium from crude oil or mixture of crude oils containing calcium naphthenate and sulfur compound including $H_2S$ and simultaneously avoiding formation of impurities, and removing or dissolving the impurities which are already formed, on account of reaction between calcium naphthenate and sulfur compound including $H_2S$ in presence of water in the crude oil or mixture of crude oils containing calcium naphthenate and sulfur compound including $H_2S$.

It is also an object of the present invention to provide an additive and method of employing that additive which is effective not only to avoid formation of impurities, but is also effective to remove or dissolve the impurities which, respectively, would have formed or are formed on account of reaction between calcium naphthenate and sulfur compound including $H_2S$ in presence of water in mixture of crude oils containing calcium naphthenate and sulfur compound including $H_2S$ even at pH of 7 or more with addition of any additional mineral acid. Additionally, the present invention aims to provide an additive which is effecting in removing metal including calcium from DOBA crude oil even at pH of 7 or more.

Other objects and advantages of the present invention will become more apparent when the following description is read in conjunction with following examples and accompanying figures, which are not intended to limit the scope of present invention.

BRIEF DESCRIPTION OF THE ACCOMPANYING FIGURES

DETAILED DESCRIPTION OF THE INVENTION

Figure 1:
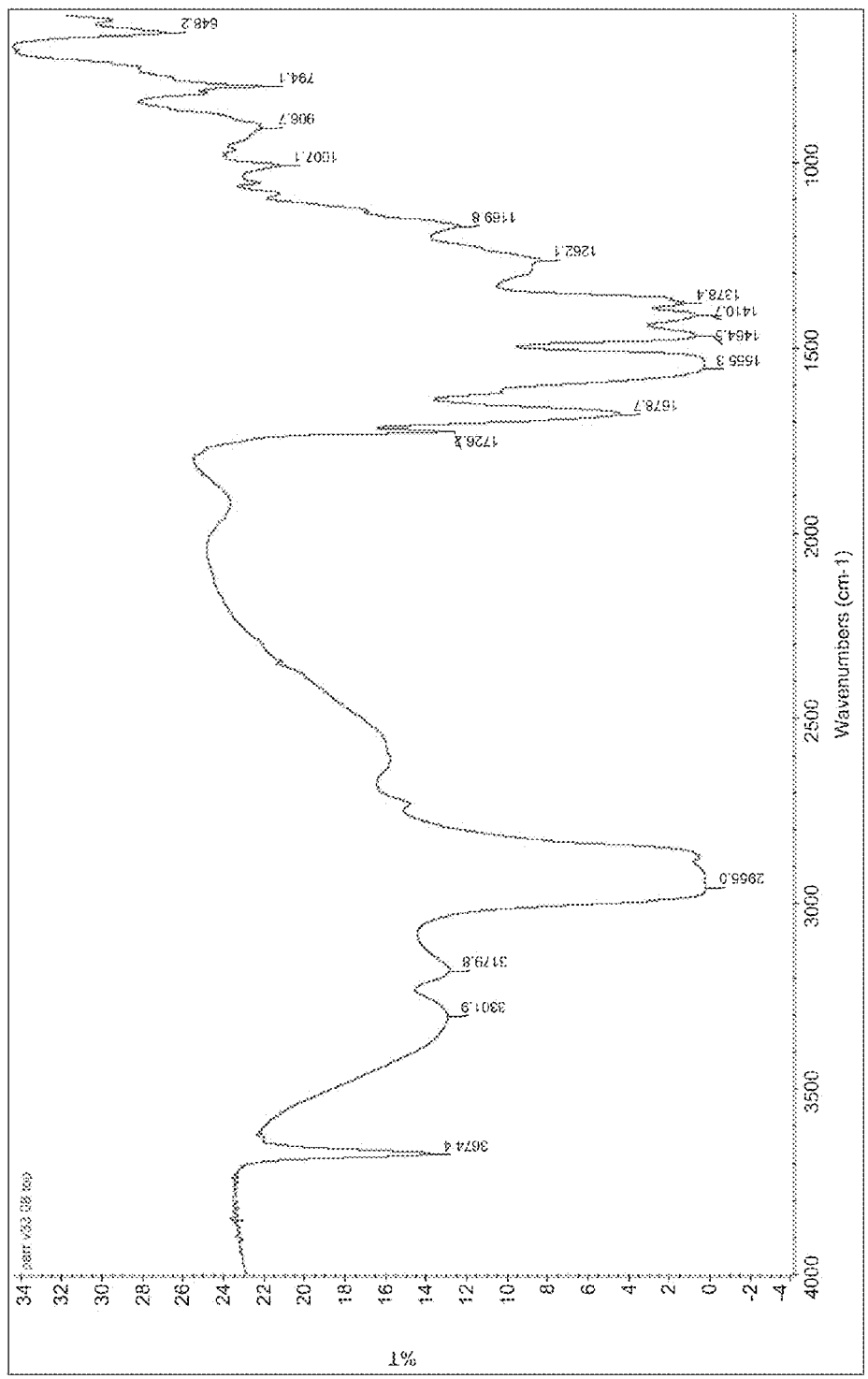
FIG. 1 illustrates IR spectra of dried organic material obtained in experiment 1 as described herein.
Figure 2:
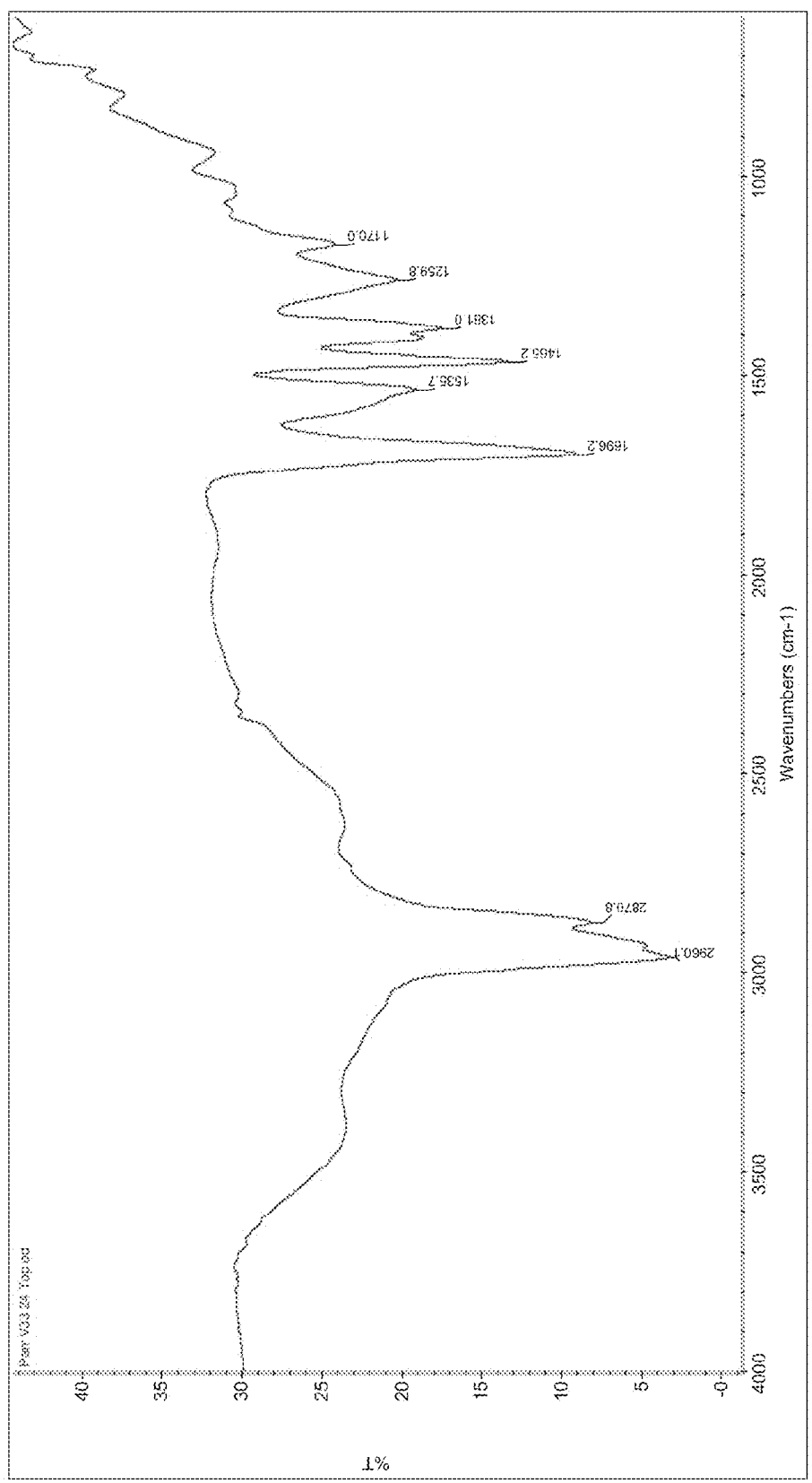
FIG. 2 illustrates IR spectra of dried organic material obtained in experiment 2 as described herein.
Figure 3:
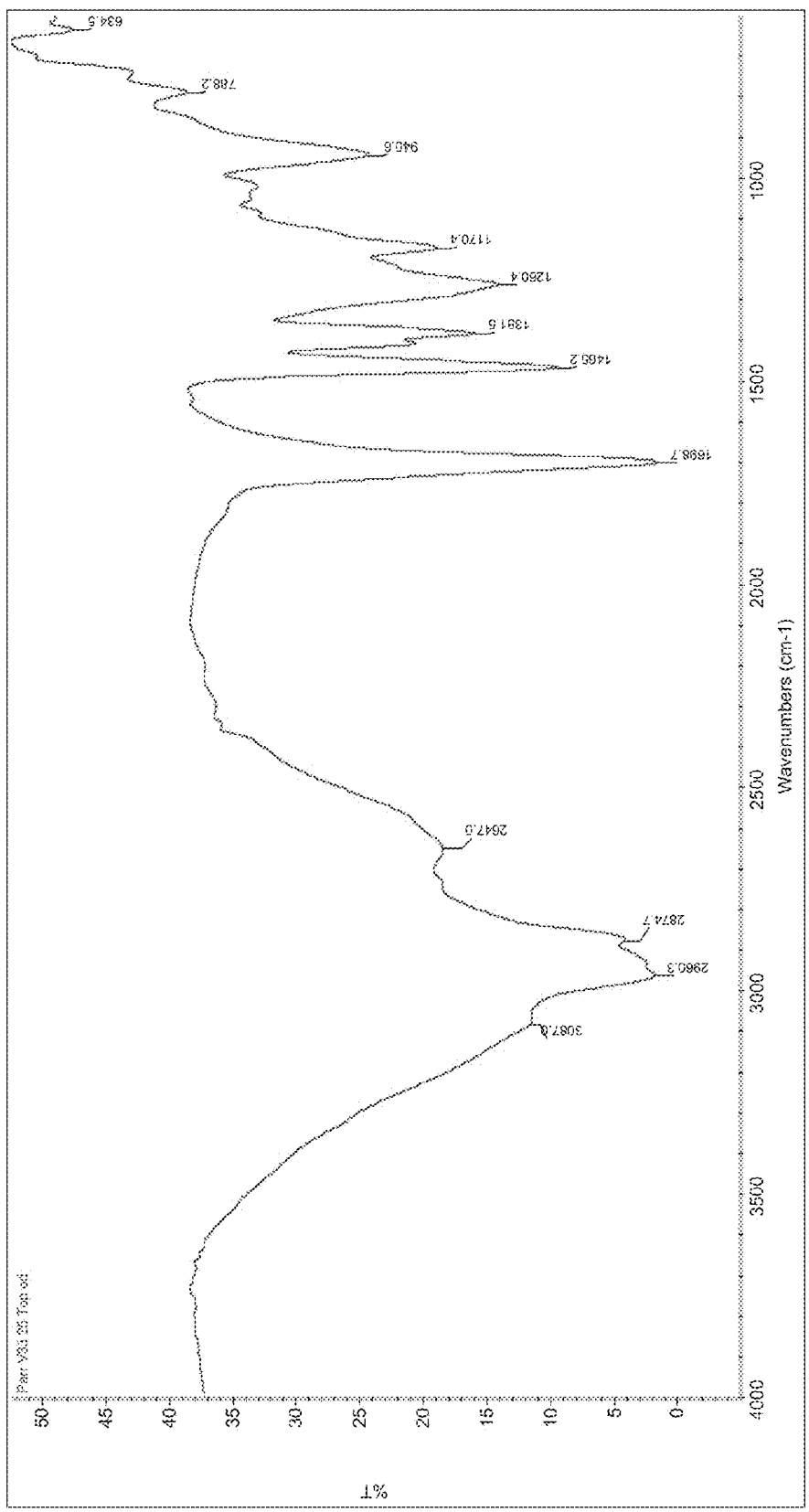
FIG. 3 illustrates IR spectra of dried organic material obtained after employing additive—citric acid as described herein.
Figure 4:
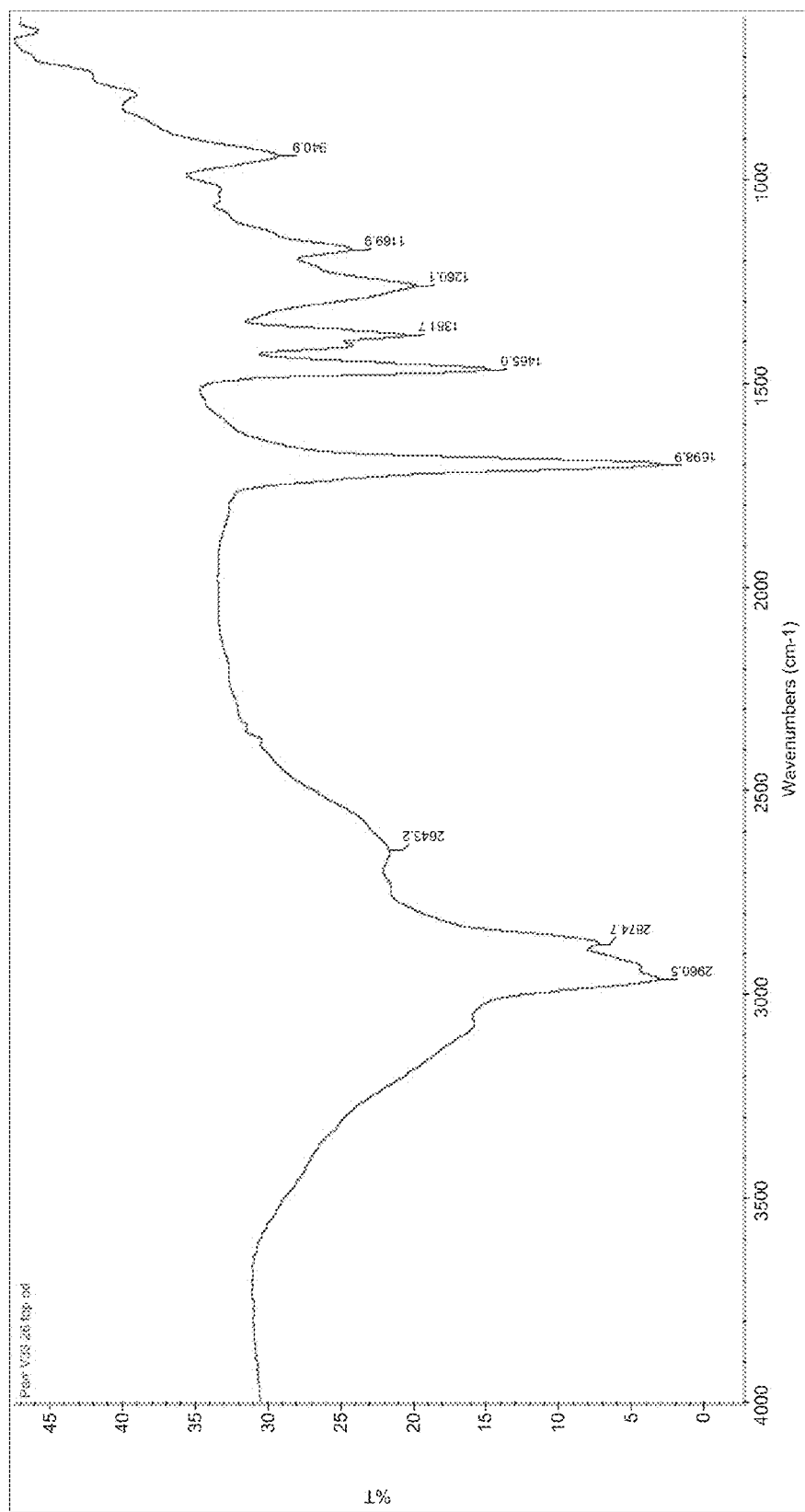
FIG. 4 illustrates IR spectra of dried organic material obtained after employing additive—maleic anhydride as described herein.
Figure 5:
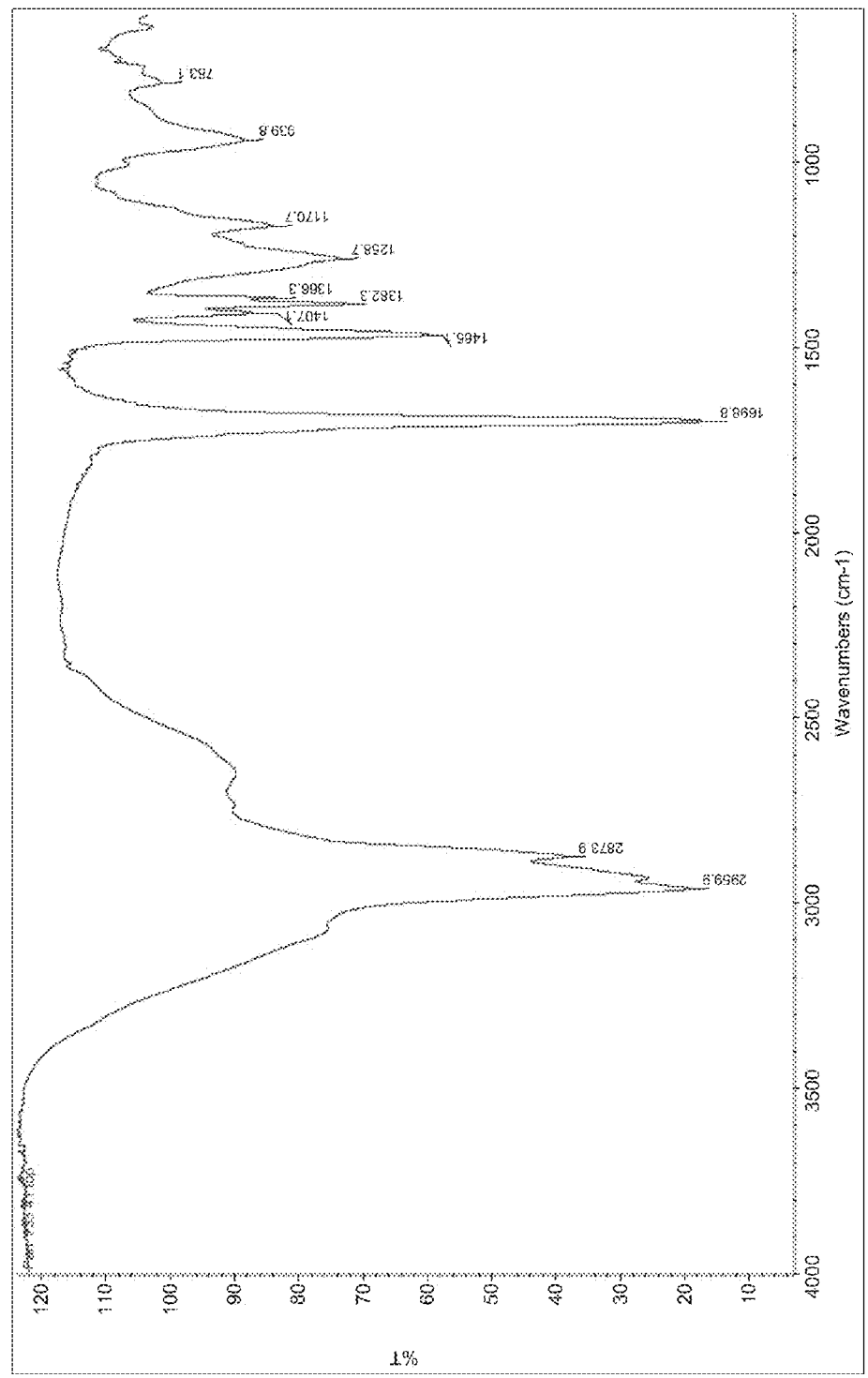
FIG. 5 illustrates IR spectra of dried organic material obtained after employing additive—glycolic acid being ineffective in avoiding formation of impurities as described herein.
Figure 6:
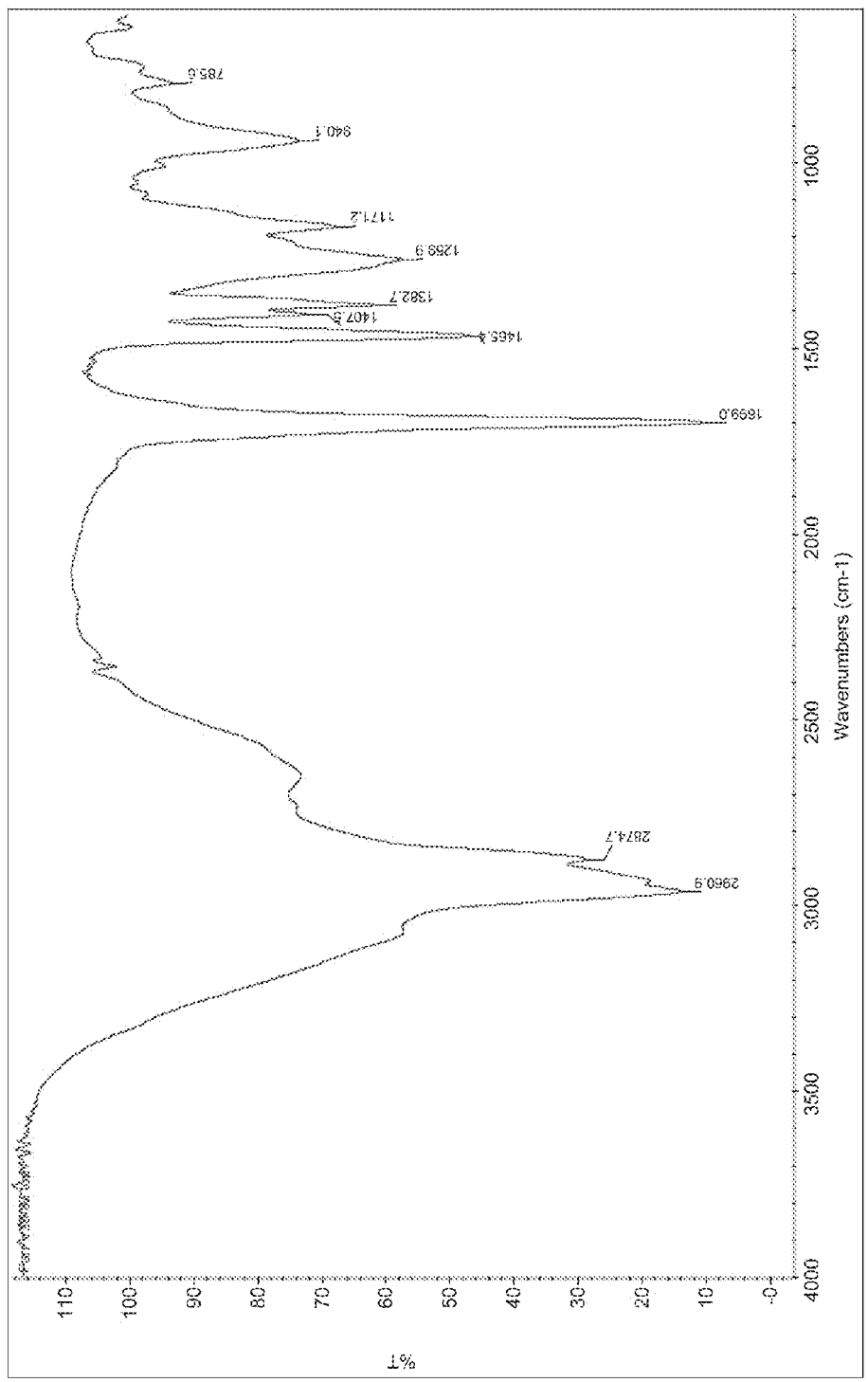
FIG. 6 illustrates IR spectra of dried organic material obtained after employing additive—glycolic acid and being ineffective in dissolving impurities formed as described herein.
Figure 7:
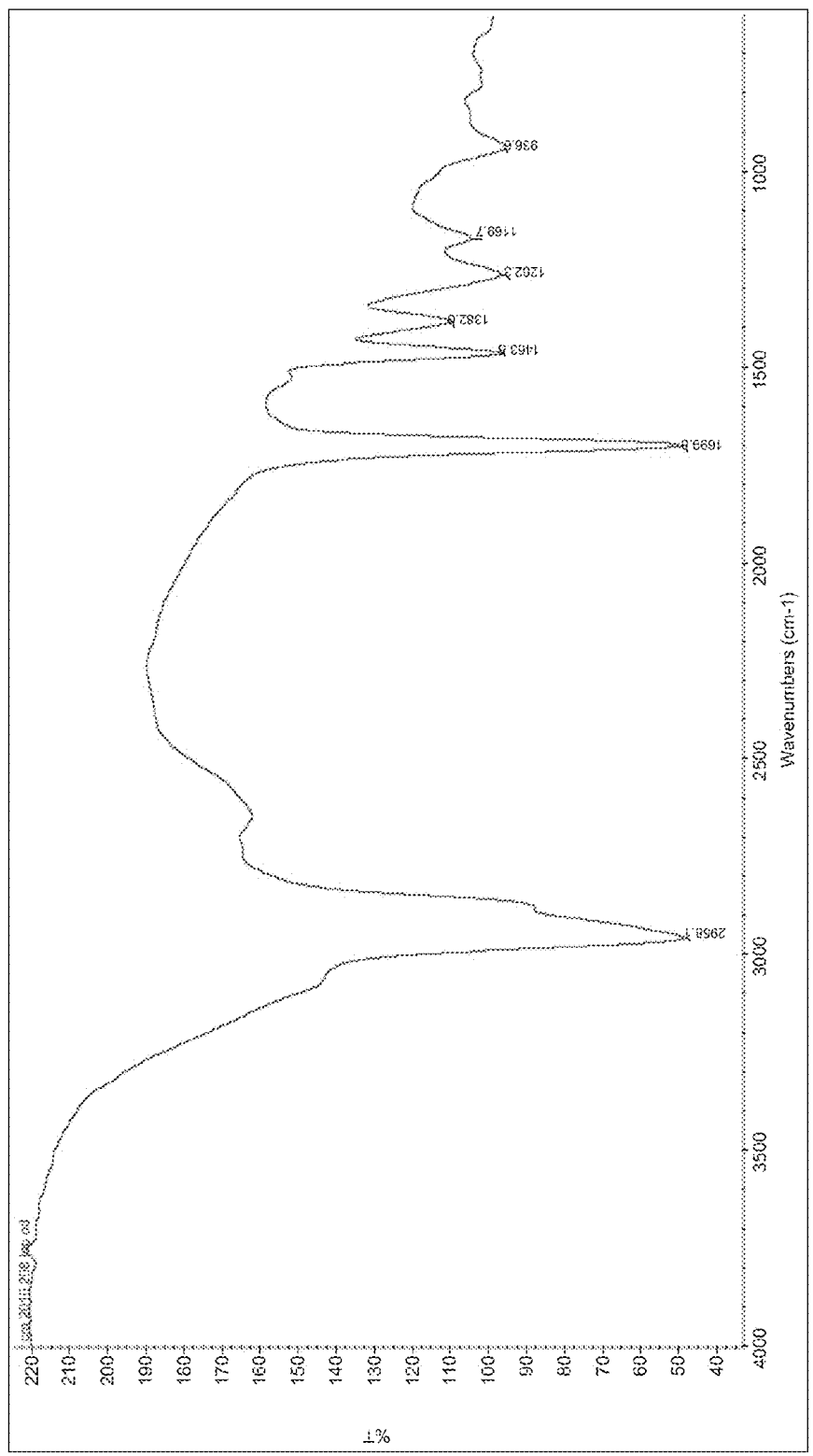
FIG. 7 illustrates IR spectra of dried organic material obtained after employing additive—DL-Malic acid being ineffective in avoiding formation of impurities as described herein.

With aim to solve above-described industrial problem of the prior art, the inventor of present invention has found that when glyoxylic acid is employed as an additive in processing of mixture of crude oils containing calcium naphthenate and sulfur compounds including $H_2S$ in presence of water, the impurities are surprisingly and unexpectedly not formed, and hence, no black layer is accumulated at the interphase of organic and aqueous layers, and if impurities are formed these surprisingly and unexpectedly get disappeared or dissolved, and hence, the black layer formed at the interphase of organic and aqueous layers surprisingly and unexpectedly get disappeared or dissolved.

Accordingly, the present invention relates to an additive capable of avoiding formation of impurities, and capable of removing or dissolving impurities already formed and accumulated at the interphase of organic and aqueous layers on reaction between calcium naphthenate and sulfur compound including $H_2S$ in presence of water in mixture of crude oils containing calcium naphthenate and sulfur compound including $H_2S$, wherein the additive is glyoxylic acid.

In one embodiment, the present invention relates to an additive capable of avoiding formation of impurities on reaction between calcium naphthenate and sulfur compound including $H_2S$ in presence of water in mixture of crude oils containing calcium naphthenate and sulfur compound including $H_2S$, wherein the additive is glyoxylic acid.

In another embodiment, the present invention relates to an additive capable of removing or dissolving impurities already formed on reaction between calcium naphthenate and sulfur compound including $H_2S$ in presence of water and accumulated at the interphase of organic and aqueous layers in mixture of crude oils containing calcium naphthenate and sulfur compound including $H_2S$, wherein the additive is glyoxylic acid.

In still another embodiment, the present invention relates to a method for avoiding formation of impurities, and for removing or dissolving impurities already formed and accumulated at the interphase of organic and aqueous layers on reaction between calcium naphthenate and sulfur compound including $H_2S$ in presence of water in mixture of crude oils containing calcium naphthenate and sulfur compound including $H_2S$, comprising step of treatment of mixture of crude oils containing calcium naphthenate and sulfur compound including $H_2S$ with glyoxylic acid.

In one embodiment, the present invention relates to a method for avoiding formation of impurities on reaction between calcium naphthenate and sulfur compound including $H_2S$ in presence of water in mixture of crude oils containing calcium naphthenate and sulfur compound including $H_2S$, comprising step of treatment of mixture of crude oils containing calcium naphthenate and sulfur compound including $H_2S$ with glyoxylic acid.

In another embodiment, the present invention relates to a method for removing or dissolving impurities already formed and accumulated at the interphase of organic and aqueous layers on reaction between calcium naphthenate and sulfur compound including $H_2S$ in presence of water in mixture of crude oils containing calcium naphthenate and sulfur compound including $H_2S$, comprising step of treatment of mixture of crude oils containing calcium naphthenate and sulfur compound including $H_2S$ with glyoxylic acid.

In yet another embodiment, the present invention relates to a an additive which is effective to remove metals including calcium from crude oil or mixture of crude oils containing calcium naphthenate and sulfur compound including $H_2S$, and simultaneously effective in avoiding formation of impurities, and removing or dissolving the impurities which are already formed and accumulated at the interphase of organic and aqueous layers, on account of reaction between calcium naphthenate and sulfur compound including $H_2S$ in presence of water in the crude oil or mixture of crude oils containing calcium naphthenate and sulfur compound including $H_2S$, wherein the additive is glyoxylic acid.

In further embodiment, the present invention relates to a method to remove metals including calcium from crude oil or mixture of crude oils containing calcium naphthenate and sulfur compound including $H_2S$, and simultaneously to avoid formation of impurities, and to remove or dissolve the impurities already formed and accumulated at the interphase of organic and aqueous layers on account of reaction between calcium naphthenate and sulfur compound including $H_2S$ in presence of water in the crude oil or mixture of crude oils containing calcium naphthenate and sulfur compound including $H_2S$, comprising treating the mixture of crude oils containing calcium naphthenate and sulfur compound including $H_2S$ with glyoxylic acid.

In accordance with present invention, a method for avoiding formation of impurities on reaction between calcium naphthenate and sulfur compound including $H_2S$ in presence of water in mixture of crude oils containing calcium naphthenate and sulfur compound including $H_2S$, comprises addition of additive glyoxylic acid before separating organic and aqueous phases which surprisingly does not allow formation of impurities which otherwise would have formed and got accumulated at the interphase of organic and aqueous phases as a black layer and hampered processing of crude oils and removal of metals including calcium.

Therefore, the additive and method of present invention have advantage of avoiding formation of impurities on account of reaction between calcium naphthenate and sulfur compound including $H_2S$ in presence of water, and hence, accumulation thereof as black layer at the interphase, which means processing of crude oils containing calcium naphthenate and sulfur compounds including $H_2S$ and removal of metals including calcium therefrom becomes easier even in presence of water by employing additive and method of present invention.

In accordance with present invention, a method for removing or dissolving impurities formed and accumulated at the interphase of organic and aqueous layers on reaction between calcium naphthenate and sulfur compound including $H_2S$ in presence of water in mixture of crude oils containing calcium naphthenate and sulfur compound including $H_2S$ comprises addition of additive glyoxylic acid after the impurities have formed which surprisingly and unexpectedly removes or dissolves the impurities formed, and hence, removes or dissolves the black layer accumulated at the interphase of organic and aqueous phases, which otherwise would have hampered processing of crude oils and removal of metals including calcium.

Therefore, the additive and method of present invention also have advantage of removing or dissolving already formed impurities on account of reaction between calcium naphthenate and sulfur compound including $H_2S$ in presence of water, and hence, removing or dissolving already accumulated black layer at the interphase, which means processing of crude oils containing calcium naphthenate and sulfur compounds including $H_2S$ and removal of metals including calcium therefrom becomes easier even in presence of water by employing additive and method of present invention.

In accordance with one of the preferred embodiments of the present invention, a method for removing or dissolving impurities already formed and accumulated at the interphase of organic and aqueous layers on reaction between calcium naphthenate and sulfur compound including $H_2S$ in presence of water in mixture of crude oils containing calcium naphthenate and sulfur compound including $H_2S$ comprises addition of additive glyoxylic acid after the impurities have formed and accumulated at the interphase of organic and aqueous layers, and the aqueous layer has pH of 7 or more, which surprisingly and unexpectedly removes or dissolves the impurities formed even if pH of aqueous layer was 7 or more, and hence, removes or dissolves the black layer accumulated at the interphase of organic and aqueous phases, which otherwise would have hampered processing of crude oils and removal of metals including calcium.

Therefore, the additive and method of present invention also have advantage of removing or dissolving already formed impurities on account of reaction between calcium naphthenate and sulfur compound including $H_2S$ in presence of water, and hence, removing or dissolving already accumulated black layer at the interphase even if pH of aqueous layer is 7 or more, preferably the pH of aqueous layer is between 7 to 9, which means processing of crude oils containing calcium naphthenate and sulfur compounds including $H_2S$ and removal of metals including calcium therefrom becomes easier even in presence of water and at pH of 7 or more, preferably pH of 7 to 9 by employing additive and method of present invention.

In accordance with one of the preferred embodiments of the present invention, the pH of aqueous layer varies from 7 to 9.

In accordance with preferred embodiment of the present invention, glyoxylic acid additive may be added either along with water or after dissolving in water.

In accordance with preferred embodiment of the present invention, the glyoxylic acid additive may be added in a stoichometric or a double stoichometric equivalent to calcium concentration, however no special benefit is seen when glyoxylic acid additive is added in double stoichometric amount with reference to calcium concentration, which means present additive and its method of employing are economical. A care is to be taken that present additive is added either in stoichometric amount or little excess with respect to calcium concentration.

Therefore, it has been observed that when glyoxylic acid additive of present invention is employed, not only formation of impurities is avoided or formed impurities are removed or dissolved, but further processing of crude oils also becomes surprisingly and unexpectedly easier resulting in removal of metals including calcium with ease and economically.

In accordance with one of the preferred embodiments of the present invention, the glyoxylic acid is identifiable by cas no. 298-12-4.

In accordance with another preferred embodiment of the present invention, the glyoxylic acid may also be referred to as oxo acetic acid.

The present invention is now explained with the help of following examples, which have been incorporated for explaining its best mode and are not intended to limit its scope.

EXAMPLES

Figure 8:
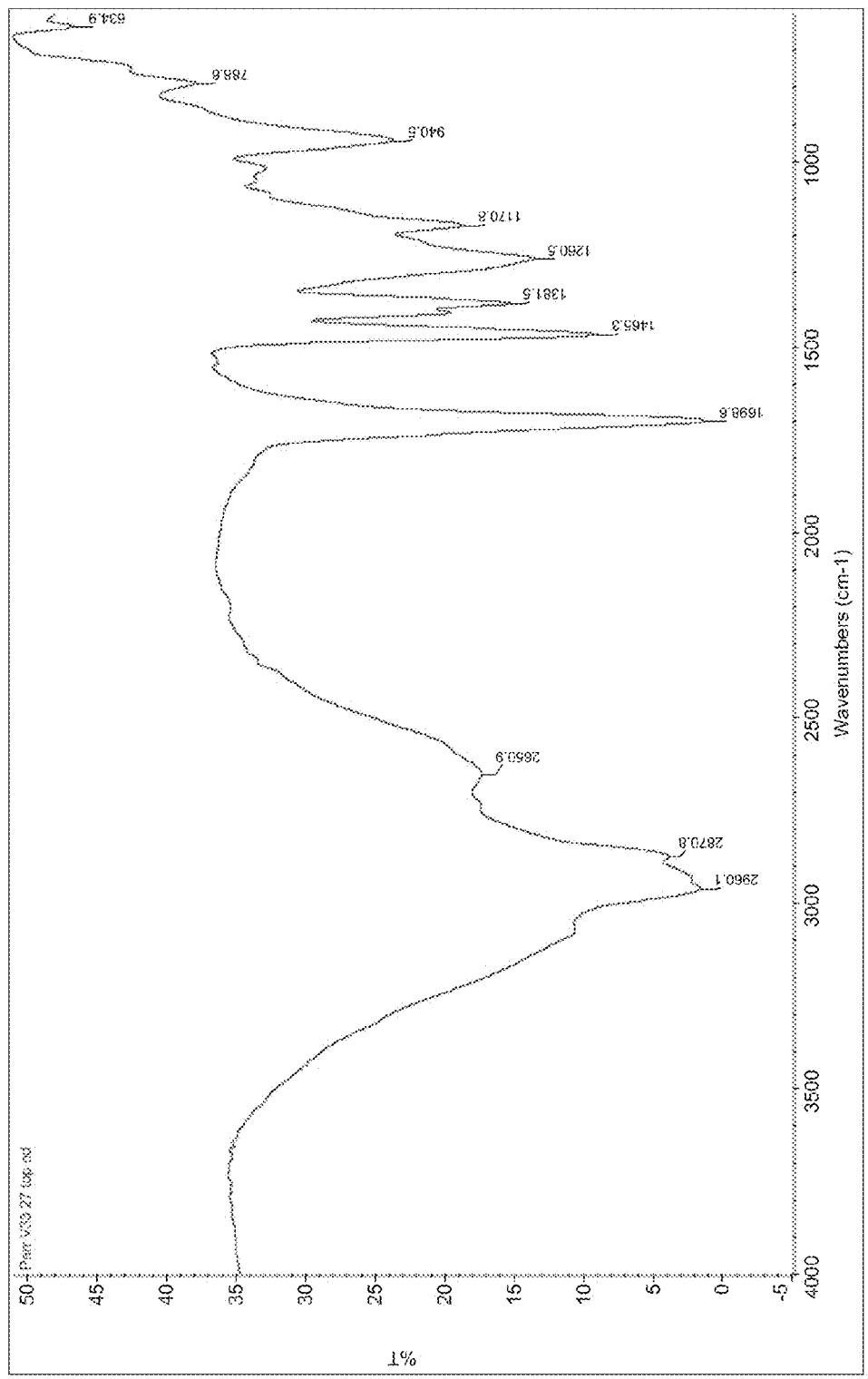
FIG. 8 illustrates IR spectra of dried organic material obtained after employing additive of present invention—glyoxylic acid in accordance with one of the preferred embodiments of the present invention and being effective in avoiding formation of impurities as described herein.

When solution of calcium naphthenate in toluene and purged with $H_2S$ as prepared in above experiment 2 was treated in same manner as in experiment 2, but with equal weight of water containing additive of present invention— glyoxylic acid in stoichometric equivalent to calcium concentration, surprisingly and unexpectedly no impurities were formed, and hence, no black layer was accumulated at the interphase of organic and aqueous layers indicating that calcium naphthenate did hydrolyze in presence of $H_2S$ [or sulfur compound] and water, but glyoxylic acid additive was effective in avoiding formation of impurities, and thereby, in accumulation of black layer at the interphase. The acid value of about 230.01 (mg KOH per gm) of separated and dried organic layer, and no peak at $1538\ cm^{-1}$ and at $1680.7\ cm^{-1}$, but strong peak at $1698.6\ cm^{-1}$ in its IR spectra, as shown in accompanying FIG. 8, were also indicative of hydrolysis of calcium naphthenate. In the description herein, this experiment may be referred to as experiment 9. This experiment confirms that additive of present invention—glyoxylic acid is effective in avoiding formation of impurities which otherwise would have got accumulated as black layer at the interphase and hampered processing of crude oils containing calcium naphthenate and sulfur compounds including $H_2S$.

When experiment 9 was repeated for different intervals with concentration of $H_2S$ in the vapour phase of about 5 vol % by employing additive of present invention—glyoxylic acid, no black layer was formed at 5, 15, 30 and 60 min intervals confirming that present additive was effective in avoiding formation of impurities and thereby accumulation of black layer at the interphase even after treatment of 5 min. The calcium content in the organic phase, as determined by ICP, was found to be as low as 12, 9, 6 and 3 ppm respectively for 5, 15, 30 and 60 min intervals confirming 99.5%, 99.6%, 99.7% and 99.9% efficiency of present additive—glyoxylic acid to remove calcium. The data including the acid value (AV) of the dried organic material is summarized in Table VIII.

TABLE VIII

| Sr. No | Time | Acid Value (MgKOH/gm) | % Efficiency (by AV) | Ca Conc. (ppm) | % Efficiency (by Ca) | Observation |
|---|---|---|---|---|---|---|
| 1 | 5 min | 218.49 | 95.0 | 12 | 99.5 | No impurities or black layer at the interphase |
| 2 | 15 min | 227.19 | 98.8 | 9 | 99.6 | No impurities or black layer at the interphase |
| 3 | 30 min | 219.59 | 95.5 | 6 | 99.7 | No impurities or black layer at the interphase |
| 4 | 60 min | 223.0 | 96.9 | 3 | 99.9 | No impurities or black layer at the interphase |

It is observed from Table VIII that calcium naphthanate hydrolyses almost completely just in 5 min, since 95% efficiency by acid value is obtained along with 99.5% efficiency by calcium removal, and these efficiencies were found to be 96.9% and 99.9% respectively at 60 min interval.

Figure 9:
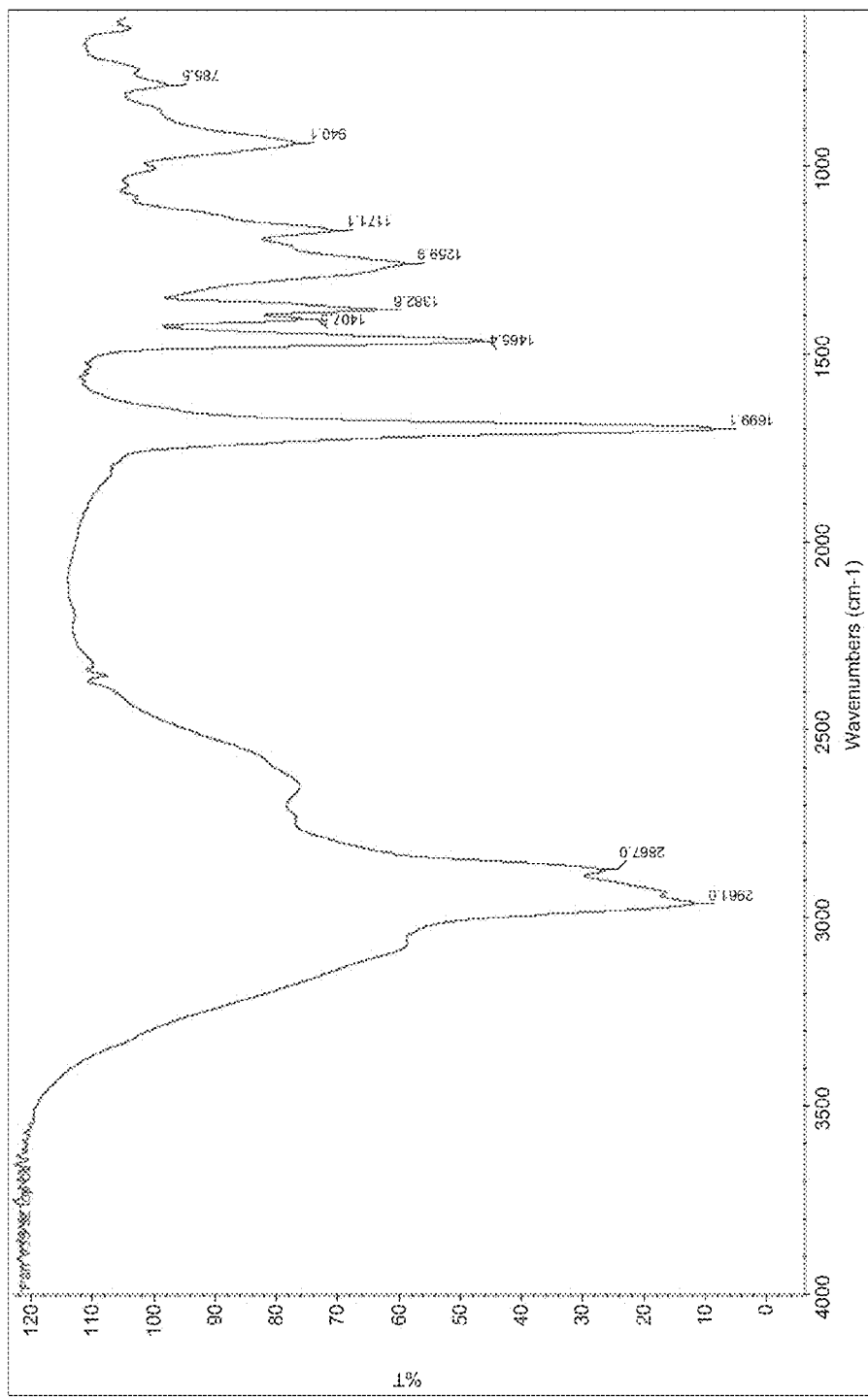
FIG. 9 illustrates IR spectra of dried organic material obtained after employing additive of present invention—glyoxylic acid in accordance with one of the preferred embodiments of the present invention and being effective in removing or dissolving impurities formed as described hereinabove.

When solution of calcium naphthenate in toluene and purged with $H_2S$ as prepared in experiment 2 was treated in same manner as in experiment 2 with equal weight of water, the impurities were formed and got accumulated as dense black layer at the interphase indicating that calcium naphthenate does hydrolyze in presence of $H_2S$ [or sulfur compound] and water. The aqueous layer was carefully drained and additive—glyoxylic acid in stoichometric equivalent to calcium concentration was dissolved in this separated aqueous layer, which is then transferred back to the separating funnel containing organic and black layers, and the contents were vigorously shaken. It was observed that black layer formed surprisingly and unexpectedly get disappeared or dissolved, which confirms that additive glyoxylic acid was effective in removing or dissolving the impurities which had got accumulated as black layer at the interphase. The acid value of about 227.82 (mg KOH per gm) of separated and dried organic layer, and no peak at 1538 $cm^{-1}$ and at 1680.7 $cm^{-1}$, but strong peak at 1699.1 $cm^{-1}$ in its IR spectra, as shown in accompanying FIG. 9, were also indicative of hydrolysis of calcium naphthenate. In the description herein, this experiment may be referred to as experiment 10. It may be noted that this experiment was also performed by direct addition of aqueous solution of additive glyoxylic acid after accumulation of black layer at the interphase, instead of separating aqueous layer and dissolving the additive therein and transferring back to separating funnel, and surprisingly it was found that black layer gets disappear or dissolved indicating that glyoxylic acid was effective in removing or dissolving black layer formed by accumulation of impurities at the interphase.

In above experiments, for the concentration of 5 vol. % of $H_2S$, the pH of aqueous layer after separation was fond to be varying between 7 to 8, preferably between 7.10 to 7.50, and for the concentration of 13 vol. % of $H_2S$, the pH of aqueous layer after separation was fond to be varying between 8 to 9, preferably between 8.10 to 7.50.

As in above experiments, the glyoxylic acid has been found to be effective in removing or dissolving the impurities, and hence, black layer already formed at the interphase on account of reaction between calcium naphthenate and sulfur compounds including $H_2S$, it can be concluded that additive of present invention is also effective in removing or dissolving already formed impurities, and hence, black layer already formed at the interphase even if pH of aqueous layer is 7 or more, preferably the pH of aqueous layer is between 7 to 9, which means processing of crude oils containing calcium naphthenate and sulfur compounds including $H_2S$ and removal of metals including calcium therefrom becomes easier even in presence of water and at pH of 7 or more, preferably pH of 7 to 9 by employing additive and method of present invention.

The above experiments confirm that solution to the industrial problems of processing mixture of DOBA or its blend containing calcium naphthenate and a crude oil containing sulfur compounds including $H_2S$ due to formation of impurities or possibility of formation of impurities upon reaction between calcium naphthenate and sulfur compounds including $H_2S$ on contact with water has been provided, and hence, processing of such mixtures of crude oils as well as removal of metals including calcium therefrom becomes easier and economical.

It may be noted that present invention has been described with the help of foregoing experiments which have been performed on the laboratory scale. It is obvious to persons skilled in the art to modify present invention to apply it to industrial scale without deviating from its scope.

The invention claimed is:

1. A method to remove metals including calcium from crude oil or mixture of crude oils containing calcium naphthenate and sulfur compound including $H_2S$,
   characterized in that said method simultaneously avoids formation of impurities and removes the impurities, if already formed and accumulated at the interphase of organic and aqueous layers, and
   characterized in that said impurities are formed on account of reaction between the calcium naphthenate and the sulfur compound including $H_2S$ in presence of water in the crude oil or the mixture of crude oils containing the calcium naphthenate and the sulfur compound including $H_2S$, comprising treating the crude oil or said mixture of crude oils containing the calcium naphthenate and the sulfur compound including $H_2S$ with glyoxylic acid.

2. The method as claimed in claim 1, wherein for avoiding formation of impurities the additive is added before separating organic and aqueous phases.

3. The method as claimed in claim 1, wherein for removing the impurities already formed comprises addition of additive glyoxylic acid after the impurities have formed.

4. The method as claimed claim 1, wherein pH of aqueous layer is 7 or more.

5. The method as claimed in claim 4, wherein pH of aqueous layer varies from 7 to 9.

6. The method as claimed in claim 1, wherein the additive is added either along with water or after dissolving in water.

7. The method as claimed in claim 1, wherein the additive is added in a stoichometric or a double stoichometric equivalent to calcium concentration.

8. The method as claimed in claim 1, wherein the additive is added either in stoichometric amount or little excess with respect to calcium concentration.

9. A method comprising using an additive consisting of glyoxylic acid for removing metals including calcium from crude oil or mixture of crude oils containing calcium naphthenate and sulfur compound including $H_2S$, characterized in that said additive simultaneously is used for avoiding formation of impurities and for removing the impurities, if already formed and accumulated at the interphase of organic and aqueous layers, and characterized in that said impurities are formed on account of reaction between the calcium naphthenate and the sulfur compound including $H_2S$ in presence of water in the crude oil or the mixture of crude oils containing the calcium naphthenate and the sulfur compound including $H_2S$, comprising treating the crude oil or said mixture of crude oils containing the calcium naphthenate and the sulfur compound including $H_2S$ with the additive consisting of glyoxylic acid.

10. The method as claimed in claim 9, wherein for avoiding formation of impurities the additive is added before separating organic and aqueous phases.

11. The method as claimed in claim 9, wherein for removing the impurities already formed the additive is added after the impurities have been formed.

12. The method as claimed in claim 9, wherein pH of aqueous layer is 7 or more.

13. The method as claimed in claim 12, wherein pH of aqueous layer varies from 7 to 9.

14. The method as claimed in claim 9, wherein the additive is added either along with water or after dissolving in water.

15. The method as claimed in claim 9, wherein the additive is added in a stoichometric or a double stoichometric equivalent to metal concentration.

16. The method as claimed in claim 9, wherein the additive is added either stoichometric amount or in excess with respect to metal concentration.

\* \* \* \* \*